United States Patent [19]
Arai et al.

[11] Patent Number: 5,754,943
[45] Date of Patent: May 19, 1998

[54] CABLE LOSS EQUALIZATION SYSTEM USED IN WIRELESS COMMUNICATION EQUIPMENT

[75] Inventors: Masami Arai; Hiroki Iwasaki, both of Tokyo, Japan

[73] Assignee: NEC Corporation, Tokyo, Japan

[21] Appl. No.: 667,600

[22] Filed: Jun. 21, 1996

[30] Foreign Application Priority Data

Jun. 21, 1995 [JP] Japan .................. 7-154450

[51] Int. Cl.$^6$ .................................. H04B 3/36
[52] U.S. Cl. .................. 455/14; 455/3.1; 455/67.4; 455/69; 455/127; 455/232.1; 330/129; 333/28 R
[58] Field of Search .................. 455/3.1, 3.2, 3.3, 455/4.1, 4.2, 5.1, 402, 9, 14, 24, 66, 67.1, 67.3, 67.4, 67.6, 68–70, 73, 39, 115, 127, 226.1, 226.4, 232.1–251.1; 333/28 R; 340/855.5, 855.7; 375/257; 330/129

[56] References Cited

U.S. PATENT DOCUMENTS

| | | | |
|---|---|---|---|
| 4,087,762 | 5/1978 | Ashley | 333/28 R |
| 4,488,126 | 12/1984 | Suthers | 333/28 R |
| 4,768,204 | 8/1988 | Zeiss . | |
| 5,442,811 | 8/1995 | Kobayashi et al. | 455/67.3 |

OTHER PUBLICATIONS

HET PTT-BEDRIJF, "Equalization of Coaxial Cables for Video Transmissions", H. Kraaijenbrink vol. 16, No. 2, Mar. 1969, pp. 101–107.

*Primary Examiner*—Reinhard J. Eisenzopf
*Assistant Examiner*—Doris To
*Attorney, Agent, or Firm*—Foley & Lardner

[57] ABSTRACT

In a wireless communication apparatus arranged by an indoor unit, an outdoor unit, and a cable used to connect the indoor unit with the outdoor unit, a gain of an amplifier is automatically set. This amplifier amplifies a lowered level of a signal caused by a cable loss. To perform such an automatic gain setting operation, a cable loss equalization system is used in this wireless communication apparatus. The cable loss equalization system compensates for a reduction in a level of a main signal caused by the cable. The indoor unit comprises: an amplifier for amplifying at least one of a main transmit signal and a main receive signal; a first power source for supplying a first power source voltage to the indoor unit and a second power source of the outdoor unit; transmitting means for transmitting the first power source voltage via the cable to the outdoor unit; receiving means for receiving a second power source voltage supplied to the second power source of the outdoor unit from this outdoor unit; and a first control unit for measuring a voltage difference between the first power source voltage and the second power source voltage to thereby perform a gain setting operation of the amplifier.

5 Claims, 3 Drawing Sheets

CABLE LOSS EQUALIZATION SYSTEM USED IN WIRELESS COMMUNICATION EQUIPMENT

BACKGROUND OF THE INVENTION

1. Field of the Invention

The present invention relates to a cable loss equalization system used in a wireless communication apparatus.

It should be understood that a wireless communication equipment is arranged by an indoor unit (referred to as an "IDU") mainly installed in an indoor space, an outdoor unit (referred to as an "ODU") installed in an outdoor space in combination with an antenna, and a coaxial cable for connecting both the IDU and the ODU. Then, various sorts of data signals are transmitted/received by employing a wireless (radio) communication line.

2. Description of the Related Art

A wireless communication apparatus directed by the present invention is constituted by, as described above, an ODU and an IDU, and also a normally one coaxial cable used to connect the ODU with the IDU.

In such a radio communication apparatus, the ODU (outdoor unit) is mounted near the antenna, and mainly transmits/receives a high (radio) frequency signal. The IDU (indoor unit) owns the modulation/demodulation processing function, the control function of the ODU, and the like. This ODU may be installed at various places, for instance, may be installed near the IDU, or apart from the IDU by several hundred of meters. As a result, the length of the coaxial cable will be changed within a range from several meters to several hundred of meters.

This coaxial cable owns the transmission function, and the power supply function. That is, as to the transmission function, the main signal is transmitted and received, and also the control signals such as the alarm/status information are transmitted between the IDU and the ODU. As for the power supply function, the electric power is supplied from the IDU to the ODU. On the other hand, the coaxial cable contains a loss. The loss of the signal (namely, lowering of signal level) will be increased in directly proportional to the cable length. Also, the loss will be increased when the frequency of the signal transmitted through this coaxial cable becomes high. Normally, since the main signal having the frequency of around 1 GHz is transmitted in this wireless communication apparatus, this loss should be compensated. In general, a variable gain amplifier is employed so as to compensate for the loss caused by this cable.

FIG. 1 is a block diagram for showing an arrangement of one conventional wireless communication apparatus. An IDU (indoor unit) 4 is constructed of a transmit amplifier 11, a receive amplifier 44, switches 19 and 41, a power source 12, a control unit 42, and a multiplexing/separating unit 14. It should be noted that since a modulating/demodulating circuit unit and a baseband unit are not directly related to the present invention, these units are omitted from this arrangement. The transmit amplifier 11 amplifies a modulated transmit signal S10 by a gain set by the switch 19. Similarly, the receive amplifier 44 amplifies a receive signal S13 by a gain set by the switch 41 to obtain a receive output signal S12. The power source 12 outputs a DC voltage S17 to be applied to an ODU (outdoor unit) 5. The control unit 42 owns such a function to communicate a control signal S40 such as alarm/status between the IDU 4 and the ODU 5. In the multiplexing/separating unit 14, a filter is contained which performs the frequency multiplexing/separating operations of these signals S11, S13, S17, and S40. Then, the output of this multiplexing/separating unit 14 is connected via a cable 3 to the ODU 5. On the other hand, the ODU 5 is constructed of a power source 21, a control unit 51, and a multiplexing/separating unit 23. The power source 21 is operated by a voltage S23 supplied from the IDU 4. The control unit 51 executes a communication of a control signal S50 such as alarm/status between the IDU 4 and the ODU 5. This control unit 51 is connected to the above-explained control unit 42. The multiplexing/separating unit 23 superimposes the voltage S23 and the control signal S50 on the main signals S20 and S21 for the transmission/reception, and then outputs the superimposed signal via a cable.

Next, operations of this conventional wireless communication apparatus will now be explained. The signal level is lowered, because of a loss in the coaxial cable 3 connected between the IDU 4 and the ODU 5. To compensate for this cable loss, the transmit amplifier 11 and the receive amplifier 44 are inserted into the main signal line for transmission/reception of the IDU 4. The level of the receive signal S13 is increased with respect to the loss component occurred in the cable 3, whereas the level of the transmit signal S10 is previously increased as to the loss component. Then, the gains of the transmit amplifier 11 and also of the receive amplifier 44 are set in a manual manner by operating gain changing switches 19 and 41 in accordance with the sort and length of the cable 3. In other words, the cable loss is compensated by the manual manner.

However, in this conventional amplifier gain setting system, when the cable 3 is replaced by another cable, the gains of the amplifiers must be again set every time the cable replacement is carried out. Also, since the gains are manually set, the erroneous gain setting operation will occur.

An object of the present invention is to provide a cable loss equalization system capable of automatically setting an optimum gain of a wireless communication apparatus for communicating transmit/receive signals via a cable.

An other object of the present invention is to provide a cable loss equalization system of an indoor unit, capable of continuously setting levels of transmit/receive signals to constant values in a wireless communication apparatus which is subdivided into the indoor unit (IDU) and an outdoor unit (ODU).

SUMMARY OF THE INVENTION

To achieve the above-described object, according to the present invention, in a cable loss equalization system used in a communication apparatus constructed of a first transmitting/receiving unit, a second transmitting/receiving unit, and a cable for connecting said first transmitting/receiving unit with said second transmitting/receiving unit, said cable loss equalization system compensates for a reduction in a level of a main signal caused by said cable.

The above-described first transmitting/receiving unit comprises:

an amplifier for amplifying at least one of a main transmit signal and a main receive signal;

a first power source for supplying a first power source voltage to said first transmitting/receiving unit and a second power source of said second transmitting/receiving apparatus;

transmitting means for transmitting said first power source voltage via said cable to said second transmitting/receiving apparatus;

receiving means for receiving a second power source voltage supplied to the second power source of said second transmitting/receiving apparatus from said second transmitting/receiving apparatus; and a first control unit for measuring a voltage difference between said first power source voltage and said second power source voltage to thereby perform a gain setting operation of said amplifier.

In the communication apparatus, the first transmitting/receiving unit is an indoor unit; said second transmitting/receiving unit is an outdoor unit; and said indoor unit is connected with said outdoor unit by a coaxial cable.

Also, the first control unit calculates a DC resistance value of said cable based upon said voltage difference, and determines a required compensation gain based upon a characteristic of a DC resistance value-to-cable loss which is previously stored, and said calculated DC resistance value.

Further, the control operation of the control unit is commenced after the power source of said first transmitting/receiving apparatus is turned ON, and a gain setting value of the amplifier is determined after a transmit amplifier of said second transmitting/receiving unit has reached a predetermined transmission level.

Then, the cable loss equalization system determines a cable loss in accordance with said DC resistance value-to-cable loss characteristic, said DC resistance value, a length of said cable, a sort of said cable, and a frequency of the main signal.

BRIEF DESCRIPTION OF THE DRAWINGS

A more complete understanding of the teachings of the present invention may be acquired by referring to the accompanying drawings, in which.

DETAILED DESCRIPTION OF THE PREFERRED EMBODIMENTS

Figure 1:
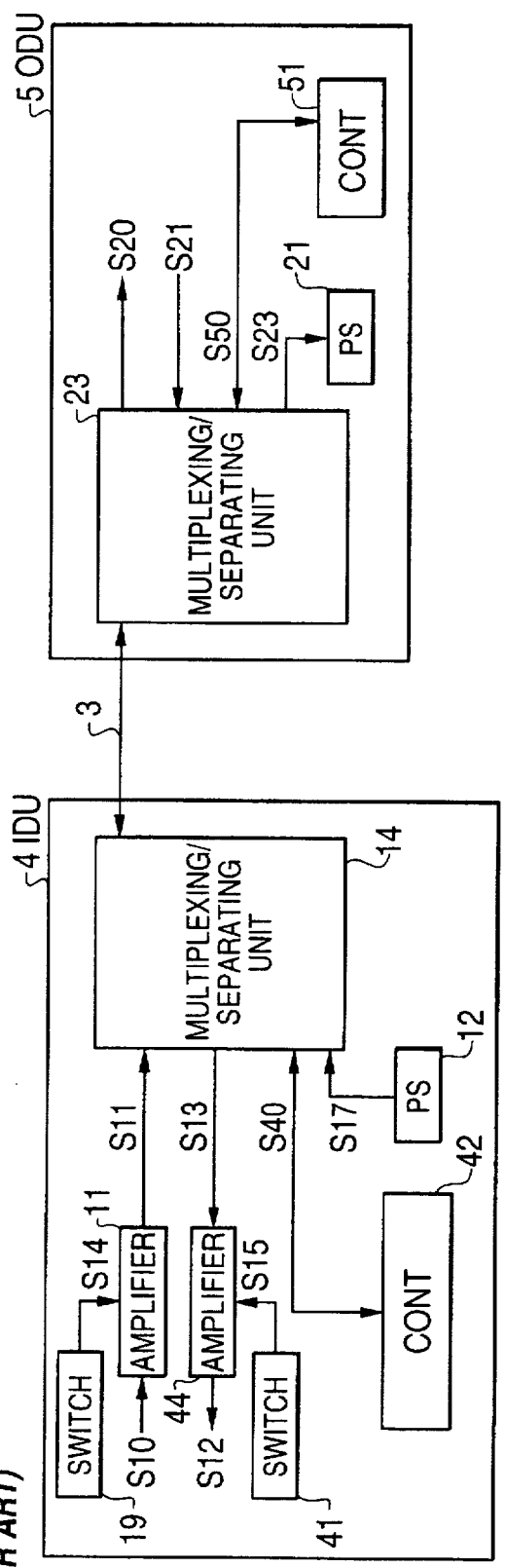
FIG. 1 is a schematic block diagram for showing the arrangement of the conventional wireless communication apparatus.
Figure 2:
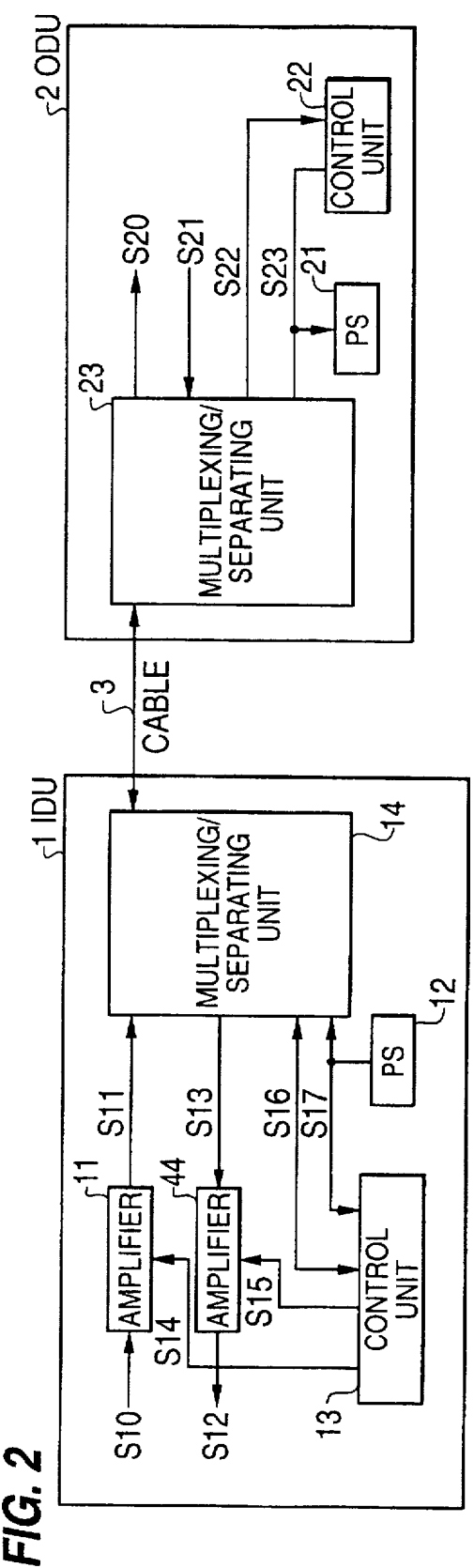
FIG. 2 is a schematic block diagram for representing an arrangement of a cable loss equalization system according to an embodiment of the present invention.

Referring now to drawings, a cable loss equalization system according to the present invention will be described. FIG. 2 schematically shows a block diagram of an IDU (indoor unit) 1 and an ODU (outdoor unit) 2 according to an embodiment of the present invention. The IDU 1 is arranged by a transmit amplifier 11, a receive amplifier 14, a power source 12, a control unit 13, and a multiplexing/separating unit 14. The transmit amplifier 11 amplifies a main signal S10 for transmission, and the receive amplifier 14 amplifies a main signal S13 for reception. The gains of these transmit amplifier 11 and receive amplifier 14 are set by the control unit 13. Also, the control unit 13 communicates a control signal S16 such as alarm/status information between the IDU 1 and the ODU 2. The power source 12 outputs a voltage S17 applied to the ODU 2. The multiplexing/separating unit 14 superimposes these signals S11, S13, S16, S17 to output the superimposed signal via a cable. The arrangement of the ODU 2 is similar to that of the prior art except for such a point that the control unit 22 executes the following measurement control as to the voltage S23.

A description will now be made of operations of this embodiment. As previously explained with reference to the prior art. A level of a signal which has passed through the cable 3 is lowered due to a loss owned by this cable 3. To detect the lowered value of this signal level, a difference between the DC voltage S17 applied from the IDU 1 and the DC voltage S23 applied to the power source 21 of the ODU 2 is utilized. That is, it is now assumed that a DC voltage difference produced between the coaxial cable 3 is "ΔV", and a DC current flown through the coaxial cable 3 is "I". In this case, assuming now that a DC resistance value of the coaxial cable 3 is "r", this DC resistance value "r" is given by the following equation (1):

$$r = \Delta V/I \qquad (1),$$

where:

a DC voltage difference is expressed as follows:

$$\Delta V = S17 - S23 \qquad (2).$$

A value of the DC current I may be precisely detected by using a simple current detecting circuit. When this DC resistance value "r" is obtained, what cable losses may be calculated based upon the characteristics of the coaxial cables, depending upon the lengths of the coaxial cables and the frequencies.

Figure 3:
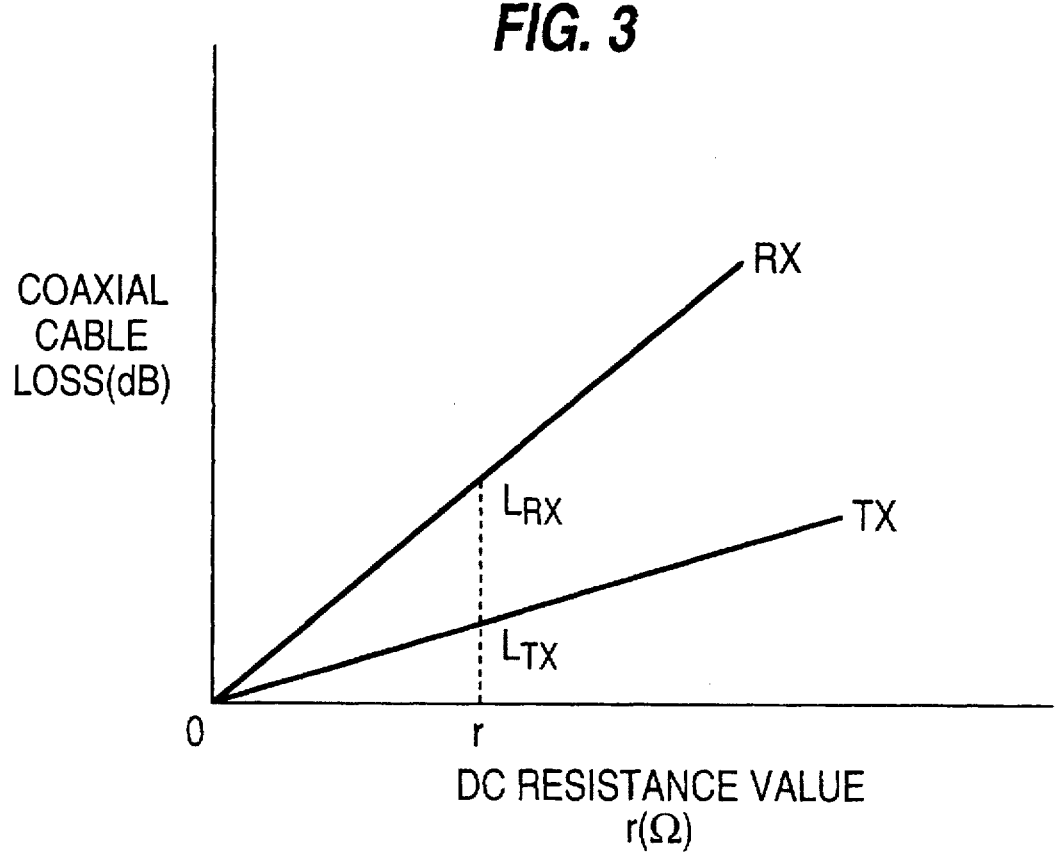
FIG. 3 shows a characteristic curve of the control unit employed in the cable loss equalization system of FIG. 2.

For instance, FIG. 3 graphically shows a relationship between this DC resistance value "r" and the high frequency loss occurred in the coaxial cable 3.

In this graphic representation, the loss of the transmit signal S11 transmitted from the IDU 1 to the ODU 2, which is caused by the coaxial cable 3, is "$L_{TX}$", whereas the loss of the receive signal S13 sent from the ODU 2 to the IDU 1, which is caused by the cable 3, is "$L_{RX}$".

Then, it is assumed that the frequency of the transmit signal S11 is lower than that of the receive signal S13. As a result, the cable loss $L_{TX}$ of the transmit signal, and the cable loss $R_{TX}$ of the receive signal with respect to the DC resistance value "r" are calculated.

The characteristic curves are different from each other, depending upon the sorts of used coaxial cables. However, the high-frequency loss characteristic of the coaxial cable normally used in the field is known. Accordingly, it is possible to obtain the equivalent characteristic curves with respect to the respective sorts of coaxial cables. The data about the equivalent characteristic curves are stored in a storage circuit (not shown in detail) of the control unit 13 employed in the IDU 1. Therefore, if the DC resistance value can be once obtained, then the high-frequency losses of the signal transmission/reception can be automatically calculated.

It should be noted that the voltage S23 transmitted from the ODU 2 to the IDU 1 is converted into digital voltage data by the control unit 22, and then this digital voltage data is digitally modulated by a low frequency. Thereafter, this digitally modulated voltage data is multiplexed with other main signal and the like in the multiplexing/separating unit 23, and the multiplexed digital modulation signal is transmitted to the IDU 1. In the IDU 1, the received digital modulation signal S16 is demodulated by the control unit 13.

Thus, the control unit 13 of the IDU 1 performs a voltage measurement of the voltage S17 inputted into the multiplexing/separating unit 14, and the control unit 22 of the ODU 2 performs a voltage measurement of the voltage S23 outputted from the multiplexing/separating unit 23. Then, these voltage values are saved as data (referred to as "data A" and "data B"). In other words, the data A corresponds to voltage value data before the cable equalization, and the data B corresponds to voltage value data after the cable equalization.

The data B corresponding to the voltage measurement result acquired on the side of the ODU 2 is transmitted to the control unit 13 for the IDU 1 by utilizing the communication between the IDU 1 and the ODU 2. The control unit 13 of the IDU 1 compares the data A with the data B to calculates a voltage difference ΔV corresponding to the difference between these data A and B. Thus, the resistance value "r" is calculated from this voltage difference ΔV. Then, this drop voltage is applied to a conversion table for a drop voltage-to-amplifying gain value which is preset, so that the gain values S14 and S15 to be set to the amplifiers are obtained.

In accordance with the above-described control operation, the transmit amplifier 11 performs the amplification defined by the gain set by the control unit 13, so that the loss of the transmit signal S11 can be compensated. On the other hand, the receive amplifier 14 amplifies the actual loss component of the receive signal S13, so that the loss of the receive signal can be compensated.

Next, the operations of the control unit 13 according to the present invention will now be described in detail.

Figure 4:
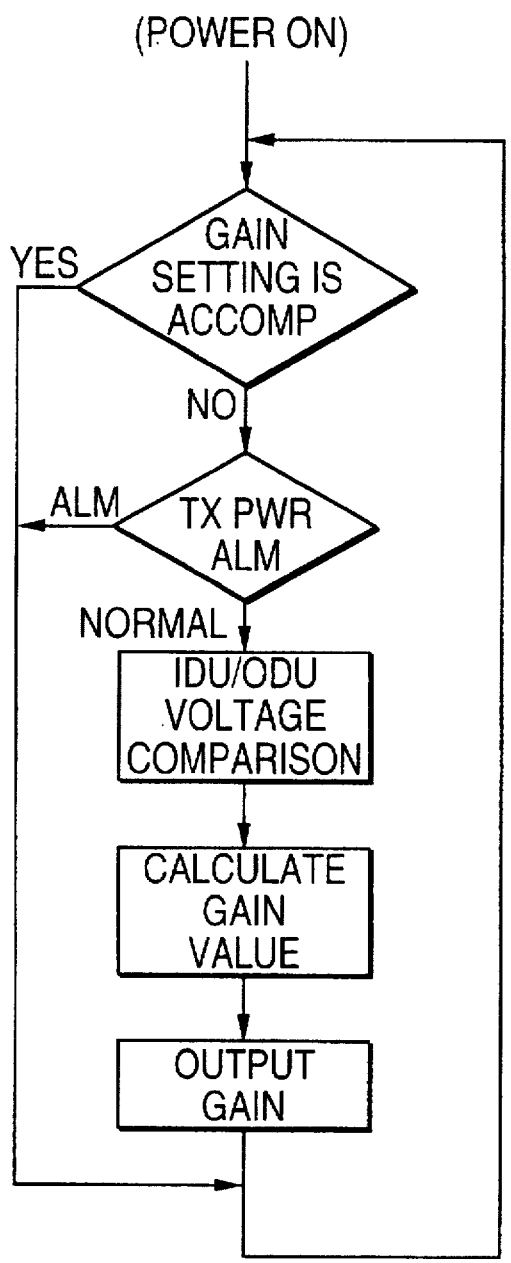
FIG. 4 is a flow chart for explaining control operations of the control unit indicated in FIG. 2.

FIG. 4 shows a control flow operation of this control unit 13.

(Step 1)

After the power source is turned ON in the IDU 1, this control flow operation is commenced. It should be noted that since there is less aging effect, the compensation for the loss caused by the coaxial cable is carried out only when the power source is turned ON.

(Step 2)

The Tx power alarm produced from the ODU 2 is detected, and after the output level of the ODU 2 becomes constant, the gain is set.

The ODU 2 increases the output from the minimum level to a predetermined set level after the power source is turned ON. When the output level becomes the minimum level, the load is low, and the current supplied from the IDU 1 to the ODU 2 is low. Then, when the output level is increased up to a preselected level, the load is increased, and also the current supplied from the IDU 1 to a ODU 2 is increased. As a consequence, since the cable resistance value "r" between the IDU 1 and the ODU 2 cannot be correctly measured unless the output level of the ODU 2 becomes stable, the gain setting operation is carried out after the Tx power alarm of the ODU 2 disappears.

(Step 3)

A detection is made of the voltage S17 in the IDU 1 and the voltage S23 transmitted from the ODU 2, so that a voltage difference ΔV is calculated.

(Step 4)

Based upon the previously stored characteristic curve of FIG. 3, the gain of the transmit amplifier 44 and the gain of the receive amplifier 44 are calculated, respectively.

(Step 5)

The control voltages corresponding to the gains calculated at the previous step 4 are outputted as S14 and S15 to the transmit amplifier 11 and the receive amplifier 15.

The above-described control operation is carried out only once after the power source is turned ON. This is because the gain setting operations of the amplifiers according to the present invention are executed so as to compensate only for the cable loss. Accordingly, since the cable loss is not varied under normal operation condition, this control operation is performed only one time after the power source is turned ON. As a consequence, the control operation is simplified, so that the work load of the CPU can be reduced.

It should be understood that the AGC (automatic gain control) function is added to the RF receive amplifier of the ODU 2 with respect to variations in the signal reception field in the wireless line in order that the output level of the ODU 2 becomes constant.

While one preferred embodiment of the present invention has described the cable loss equalization system applied to the radio communication apparatus including the indoor unit and the outdoor unit, the present invention is not limited thereto. Apparently, the present invention may be applied to various transmission apparatuses for transmitting signals in combination with power. Also, the power supply arrangement has been described in which the power is supplied from the indoor unit to the outdoor unit as one example of the power supply arrangement. Apparently, the present invention is not limited thereto, but may be applied to other power supply arrangement such that, for instance, the power supply direction thereof is set opposite to that of the above-explained power supply arrangement, and the signal amplifier is installed on the side of the apparatus for receiving the power.

As previously described, the gain setting operation of the amplifier can be performed when the cable connected between the units is changed. In addition, it may be arranged such that measurement data about a power source voltage (namely, a voltage for a power source) is continuously transferred from a control unit employed in an external apparatus to the control unit provided on the transmission side, so that the amplifier gain may be controlled. Alternatively, the amplifier gain may be again set when the measurement data is varied, or the difference value is changed.

Furthermore, the above-described multiplexing/separating unit may directly synthesize the main signal with the power source voltage, or may directly separate the main signal from the power source voltage as the superposing/multiplexing operations of these main signal and power source voltage. Alternatively, the multiplexing/separating unit may multiplexing the time divisional signal to perform the superimposing/multiplexing/separating operations of the main signal/power source voltage.

As previously described in detail, in accordance with the cable loss equalization system of the present invention, the gain of the amplifier is determined to be set into this amplifier based upon the difference between the voltages equalized before/after the coaxial cable, applied to the power source of the ODU. Accordingly, there are such advantages that the manual gain setting operation required in the prior art every time the length of the cable and the sort thereof are varied can be omitted, and also the automatic gain setting operation of the present invention can be performed irrelevant to the erroneous gain setting operation and also the change in the cable characteristics.

What is claimed is:

1. A cable loss equalization system used in a communication apparatus constructed of a first transmitting/receiving unit, a second transmitting/receiving unit, and a cable for connecting said first transmitting/receiving unit with said second transmitting/receiving unit, said cable loss equalization system compensating for a reduction in a level of a main signal caused by said cable, wherein:

said first transmitting/receiving unit comprises:

an amplifier for amplifying at least one of a main transmit signal and a main receive signal;

a first power source for supplying a first power source voltage to said first transmitting/receiving unit and a second power source of said second transmitting/receiving unit;

transmitting means for transmitting said first power source voltage via said cable to said second transmitting/receiving unit;

receiving means for receiving a second power source voltage supplied to the second power source of said second transmitting/receiving unit from said second transmitting/receiving unit; and a first control unit for measuring a voltage difference between said first power source voltage and said second power source voltage to thereby perform a gain setting operation of said amplifier.

2. A cable loss equalization system as claimed in claim 1 wherein:

in said communication apparatus, said first transmitting/receiving unit is an indoor unit; said second transmitting/receiving unit is an outdoor unit; and said indoor unit is connected with said outdoor unit by a coaxial cable.

3. A cable loss equalization system as claimed in claim 1 wherein:

said first control unit calculates a DC resistance value of said cable based upon said voltage difference, and determines a required compensation gain based upon a characteristic of a DC resistance value-to-cable loss which is previously stored, and said calculated DC resistance value.

4. A cable loss equalization system as claimed in claim 3 wherein:

the first control operation of the control unit is commenced after the power source of said first transmitting/receiving unit is turned ON, and a gain setting value of the amplifier is determined after a transmit amplifier of said second transmitting/receiving unit has reached a predetermined transmission level.

5. A cable loss equalization system as claimed in claim 3 wherein:

said cable loss equalization system determines a cable loss in accordance with said DC resistance value-to-cable loss characteristic, said DC resistance value, a length of said cable, a sort of said cable, and a frequency of the main signal.

* * * * *